United States Patent

Hower, Jr.

[11] Patent Number: 5,730,427
[45] Date of Patent: Mar. 24, 1998

[54] TRAILER SPRING ASSEMBLY

[75] Inventor: William E. Hower, Jr., Berwick, Pa.

[73] Assignee: Dana Corporation, Toledo, Ohio

[21] Appl. No.: 623,191

[22] Filed: Mar. 28, 1996

[51] Int. Cl.$^6$ .................. B60G 11/02; F16F 1/24
[52] U.S. Cl. .................. 267/47; 267/45; 267/36.1
[58] Field of Search .................. 267/7, 36.1, 40, 267/41, 44, 45, 47, 158, 160, 164, 49, 260, 262; 280/121, 669, 686, 694, 699

[56] References Cited

U.S. PATENT DOCUMENTS

| | | | |
|---|---|---|---|
| 61,712 | 5/1867 | Chaffee | 267/49 |
| 1,127,511 | 5/1915 | Potter | 267/49 |
| 1,411,640 | 4/1922 | Menges | 267/49 |
| 1,465,197 | 8/1923 | White | 267/44 |
| 3,705,718 | 12/1972 | Fukui et al. | 267/47 |
| 3,975,005 | 8/1976 | Duchemin | 267/47 |
| 4,512,559 | 4/1985 | Aoyama et al. | 267/47 |
| 4,637,594 | 1/1987 | Saito | 267/47 |
| 5,209,518 | 5/1993 | Heckenliable et al. | 280/680 |

*Primary Examiner*—Lee W. Young
*Assistant Examiner*—Pamela J. Lipka
*Attorney, Agent, or Firm*—Oldham & Oldham Cp., L.P.A.

[57] ABSTRACT

A leaf spring assembly for the suspension of an axle of a vehicle, particularly a trailer, has a plurality of superposed steel plates, the ends of the longest of the plates being adapted or formed into means, preferably hooks, for mounting the leaf spring assembly into hangers affixed to the vehicle and the midpoint of the shortest of the plates having its lower surface adapted for being affixed to the axle. The leaf spring assembly is characterized by having a ratio of the horizontal distance between the centerlines of the hooks and the vertical distance between the tops of the hooks and the lower surface of the leaf spring assembly, such ratio being greater than about 6.0:1 and, most preferably, greater than 8.0:1. The leaf spring is further characterized by having a ratio of the length of the longest of the plates to the width of the plate of at least 20.0:1, with the width of all plates being essentially identical. The preferred leaf spring assembly comprises at least four such plates.

8 Claims, 2 Drawing Sheets

TRAILER SPRING ASSEMBLY

The present invention relates to a spring assembly, particularly to a spring assembly for the suspension of an axle of a trailer. Even more particularly, the trailer spring assembly provides a soft ride comparable to that available from an air-ride type suspension. The trailer spring assembly of the present invention provides advantages over the comparable air-ride suspension by being lighter and potentially less expensive.

BACKGROUND OF THE ART

Traditionally, trailers have been provided with leaf-spring assemblies to cushion the suspension of trailer axles. In recent years, the need to provide an even smoother ride when transporting delicate instruments, particularly electronic equipment, has resulted in a loss of leaf-spring sales to this industry, with the leaf spring assemblies being replaced in many applications by an "air-ride" type of suspension. It is believed that improved designs for leaf spring assemblies can recapture some of the market lost to the "air-ride" suspensions.

SUMMARY OF THE INVENTION

It is an object of the present invention, therefore, to improve the deflection characteristics of a leaf spring assembly by providing a leaf spring assembly with a longer span between the loading points without substantially affecting the mounting height of the suspension, that is, the vertical distance from the center of the axle to the bottom of the vehicle frame.

Such a leaf spring assembly is provided by a laminated leaf spring assembly, comprising a plurality of superposed steel plates. Each of the plurality of plates is adapted to undergo bending deformation in a direction perpendicular to its length and parallel to its thickness thereof. A central portion of each of the plates in the lengthwise direction has a constant maximum thickness which is gradually decreasing towards the opposite ends of the plate to form tapered portions. The plurality of superposed plates varies in length from top to bottom, the longest of the plates being on top. The longest plate has its ends adapted for attachment to frame fixtures of a vehicle, preferably by being formed into hooks. The shortest of the plates has a lower surface adapted for attachment to an axle of the vehicle. The leaf spring assembly is characterized by a ratio of the horizontal distance between the centerlines of the hooks and the vertical distance between the tops of the hooks and the lower surface of the leaf spring assembly which is greater than about 6.0:1. The invention is further characterized by the ratio of the length of the longest of the plates to the width of the plate being at least 20.0:1. The invention is yet further characterized by the ratio of the horizontal distance between the centerlines of the hooks and the vertical distance between the tops of the hooks and the lower surface of the leaf spring assembly is greater than 8.0:1. In the preferred leaf spring assembly, the assembly comprises at least four said superposed plates. In the preferred embodiment the longest plate of the plurality of superposed steel plates has a span of at least 55 inches between the centerlines of the hooks at each end when the assembly is in an unloaded condition.

In another way of expressing the invention, the leaf spring assembly has a plurality of superposed steel plates in an arch configuration, the leaf spring assembly being characterized by an average deflection of at least about 2 inches when an overall force of 7750 pounds is imposed upon a midpoint of the shortest of the plurality of plates in the direction of the arch. Such a leaf spring assembly has the two ends of the longest of the plurality of plates mounted such that the ends are generally symmetrical to the midpoint and are at least 55 inches apart. In such a leaf spring assembly, the width of each of the plurality of plates is less than 5% of the length of the longest of the plurality of plates.

BRIEF DESCRIPTION OF THE DRAWINGS

A better understanding of the present invention will be had when reference is made to the accompanying drawings, in which identical part numbers are referenced with identical reference numerals and wherein.

DETAILED DESCRIPTION OF THE DRAWINGS

Figure 1:
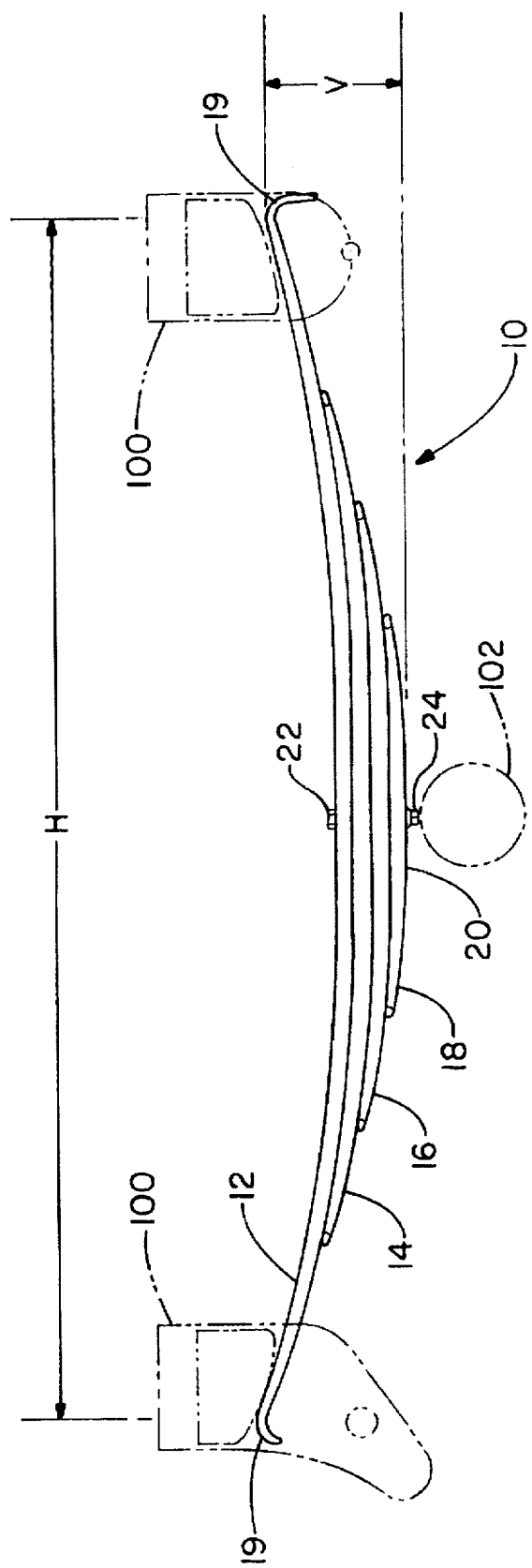
FIG. 1 shows a side view of the vehicle axle suspension system of the present invention.

A leaf spring assembly 10 of the present invention is shown in FIG. 1. The leaf spring assembly 10 has a plurality of leaves 12, 14, 16, 18, the longest of the leaves 12 spanning the distance between a pair of hangers 100 mounted on a vehicle (details not shown) having an axle 102, which is cushioned by the leaf spring assembly. The leaf spring assembly 10 is positioned in the hangers 100 at the respective ends of the longest leaf 12 and a flat lower surface 20 of the shortest leaf 18 of the leaf spring assembly provides a mounting surface for attachment to the top of the axle 102. In the preferred embodiment, the leaf spring assembly 10 has a hook 19 formed at each of the ends of the first leaf 12 for mounting of the leaf spring assembly in the hangers 100 on the vehicle, although other conventional adaptations of the ends for mounting in the hangers will be known to those of skill in this art. In such a vehicle suspension, the general nature of the suspension may be characterized by the horizontal distance H between the centerlines of the hooks 19 and the vertical distance V between a straight line drawn tangent to the tops of the hooks 19 and the lower surface 20 of the leaf spring assembly 10.

In a typical leaf spring suspension as would be known in the art, the ratio H/V would be in the range of about 4.9:1 to about 6.9:1. In many of these leaf spring assemblies known in the prior art, the assembly is somewhat non-symmetric from front to rear, so that the vertical height as measured at the front end and the rear end will be different and the horizontal distance of the axle center from the front and rear ends is not necessarily the same. Three examples of known leaf spring assemblies will illustrate this point. A Hutchens Part No. 354-00 leaf spring assembly has a front height of 8.71 inches and a rear height of 8.15 inches. The same spring assembly also has a front length of 21.44 inches and a rear length of 20.25 inches for a total length or H of 41.69 inches. Because the assembly is non-symmetrical, the vertical distance V at the axle is 8.42 inches, which represents the rear height of 8.15 inches plus 0.27 inches, which is calculated by multiplying the overall height difference from rear to front of 0.56 inches by the ratio of the rear length to the overall length. In this high arch spring assembly, then, the ratio H/V is 41.69/8.42, or 4.95.

In a similar fashion, a Hutchens Part No. 355-00 leaf spring assembly has a front height of 7.34 inches and a rear height of 6.59 inches. The spring assembly also has a front length of 21.44 inches and a rear length of 20.25 inches for a total length or H of 41.69 inches. Because the assembly is non-symmetrical, the vertical distance V at the axle is 6.95 inches, which represents the rear height of 6.59 inches plus 0.36 inches, which is calculated by multiplying the overall height difference from rear to front of 0.75 inches by the ratio of the rear length to the overall length. In this mid arch spring assembly, then, the ratio HN is 41.69/6.95, or 5.99.

In a yet further example, a Hutchens Part No. 356-00 leaf spring assembly has a front height of 6.27 inches and a rear height of 5.96 inches, while maintaining the same front length of 21.44 inches and rear length of 20.25 inches for a total length or H of 41.69 inches as seen in Parts 354-00 and 355-00. Because the assembly is non-symmetrical, the vertical distance V at the axle is 6.11 inches, which represents the rear height of 5.96 inches plus 0.15 inches, which is calculated by multiplying the overall height difference from rear to front of 0.31 inches by the ratio of the rear length to the overall length. In this low arch spring assembly, then, the ratio HN is 41.69/6.11, or 6.82.

Each of the above leaf spring assemblies does not provide a suitable soft ride to be competitive with an "air ride"-type suspension, even though the "air ride"-type suspension is heavier and, potentially, more expensive.

In contrast to these known leaf spring assemblies, all of which comprise three leaves, the present invention leafspring assembly 10 is shown in side-view in FIG. 1. The preferred assembly comprises four interconnected leaves 12, 14, 16, 18. Of these, the longest leaf 12 spans 59.62 inches between the centerlines of the hooks 19, with an arch of 3.56 inches from the tops of the hooks to the top of the mid-point when hung in a non-loaded position. To achieve this, the first leaf 12 is 64.62 inches long, the first 9.62 inches of each end being tapered, with the balance of the length being substantially flat. The preferred width is 2.97 inches. The second leaf 14 is 43.75 inches long, with the first 5.50 inches of each end being tapered, the balance being substantially flat. The third leaf 16 is 32.00 inches long, with the first 5.50 inches of each end being tapered and the balance being substantially flat. The fourth leaf 18 is 20.25 inches long, with the first 5.50 inches of each end being tapered anti the balance being substantially flat. In each leaf 12, 14, 16, 18, the material is nominally 0.788 inches thick, with the tapered thickness being 0.22 inches at the ends of the first leaf 12 and the tapered thickness being 0.30 inches at the ends of the second through fourth leaves 14, 16, 18.

The four leaves are connected through the centerline of each leaf by a center bolt 22 secured by a center nut 24. The metal used in each leaf is SAE Grade 51B60H. The ends of each of the second through fourth leaf 14, 16, 18 bear against the lower side of the body of the next longer leaf 12, 14 or 16, respectively, but the ends are not fixed to the body of the next longer leaf. The hooks 19 on the ends of the first or longest leaf 12 are mounted in the hangers 100 in a manner such that they may slide upon the hangers, yet be retained in place.

As is commonly known in the art, both the leaf spring assembly 10 of the present invention and the comparison leaf spring assemblies described above will preferably be used in association with a thin liner sheet that is placed between the leaves. Each of these liner sheets is centered on the center bolt 22 and held in place with a hole through which the center bolt passes. These liner sheets are very thin in comparison to the leaves, having a thickness on the order of 0.040 inches, and they have a width slightly smaller than the width of the leaves. The length of each liner sheet is about 8 inches long, which is approximately the length of the flat untapered portion of the shortest leaf in any of the assemblies. While certainly it is preferred that these liner sheets be used, they are not involved in the operativeness of the present invention. Because of this and because they are so insignificant in contributing to size and weight of the leaf spring assemblies, they are not shown in FIG. 1.

At a loading of 7750 pounds, this spring assembly 10 demonstrates a deflection of approximately 2.09 inches, compared to a deflection of 1.42 inches on Hutchens Part 355-00 mid-arch leaf assembly described above at the identical loading. When the thickness of the leaf spring assembly 10 of the present invention at the midpoint is considered, the height differential between the top surface of the hooks 19 and the bottom 20 of the leaf spring assembly is approximately 6.83 inches, which is very close to the 6.95 inch V distance described above for the Hutchens Part 355-00, even though the present invention leaf assembly is much longer and has four leaves rather than three. With an H distance of 59.62 inches, as stated above, the HN ratio for the present invention 10 is approximately 8.7, or approximately 45% larger than the 5.99 HN ratio of the Hutchens Part 355-00.

The weight of the first leaf 12 is nominally 37.2 pounds; the weight of the second leaf 14 is nominally 25.9 pounds, the weight of the third leaf 16 is nominally 18.3 pounds; and the weight of the fourth leaf 18 is nominally 10.8 pounds, for a total weight of 92.2 pounds for the leaf spring assembly 10.

To demonstrate some of the differences, the Hutchens Part No. 355-00 leaf spring assembly would have three leaves. Of these, the longest has a length of 47.56 inches, with the first 9.00 inches of each end being tapered and the balance being substantially flat. When hung in a non-loaded position, this leaf spans 41.69 inches between the centerlines of the hooks and has an arch of 4.49 inches from the tops of the hooks to the top of the midpoint. The second leaf is 29.00 inches long and has the first 5.12 inches of each end tapered, the balance being substantially flat. The third leaf is 18.50 inches long, with the first 5.12 inches of each end being tapered, the balance being substantially flat. The metal used is the same 51B60H material used in the present invention, with a thickness of 0.788 inches in the untapered portions, tapered to 0.22 inches in the first leaf and tapered to 0.30 inches in the second and third leaves. The width of each leaf was 2.97 inches. Respective weights of the leaves (going from longest to shortest) is 26.4 pounds, 16.5 pounds and 9.9 pounds, for a total weight of 52.8 pounds. The vast majority of the 39.4 pounds in weight difference will be seen to be in the addition of the fourth leaf.

It is also clear from the above description that the longest leaf 12 of the present invention has a ratio of the horizontal span H to the width of the leaf of 59.62/2.97, or approximately 20.1. The Hutchens Part 355-00 has a corresponding ratio of 41.69/2.97 or approximately 14.03.

Figure 2:
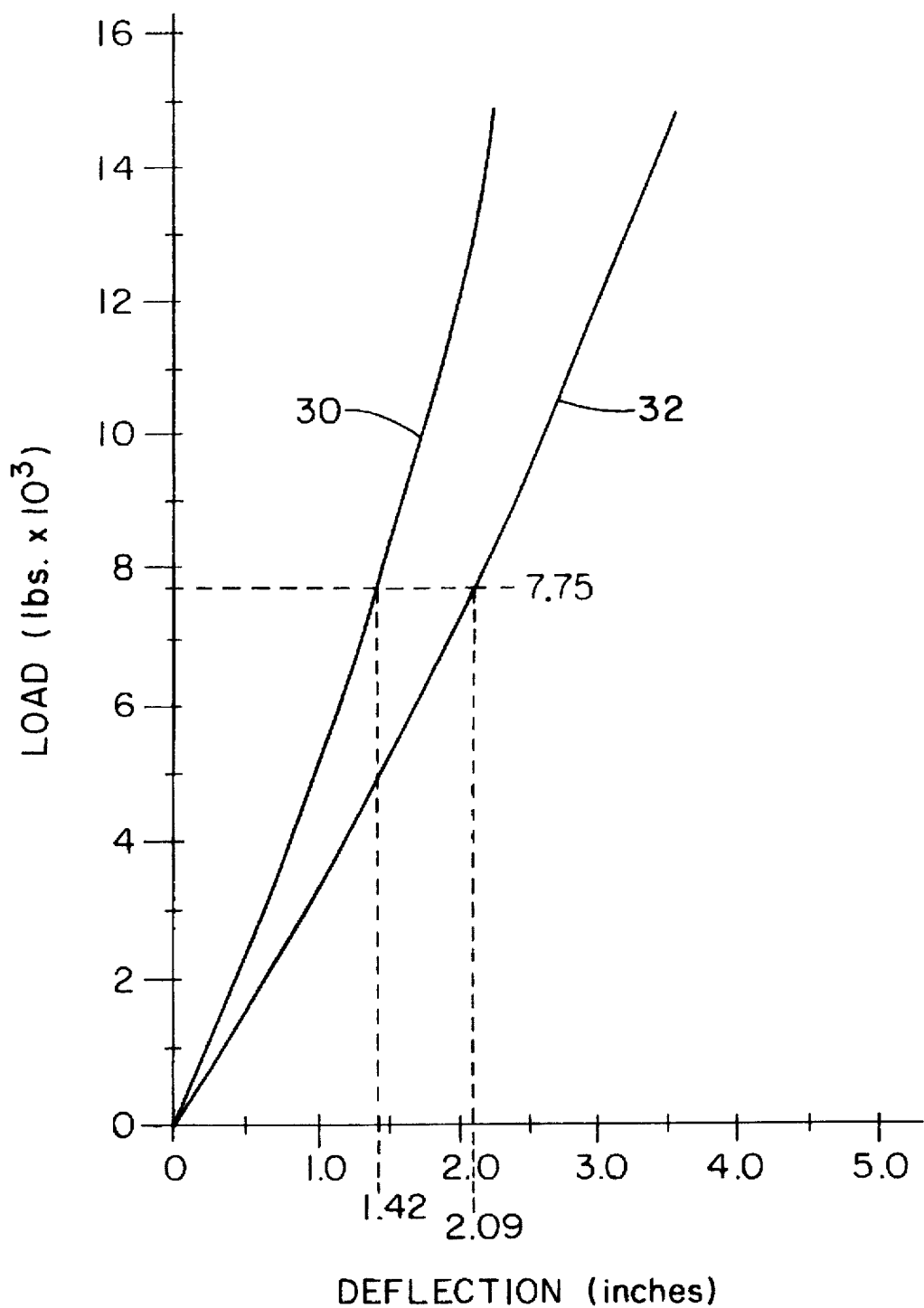
FIG. 2 shows a diagram of the average load versus deflection for the present invention and a comparison leaf spring assembly.

As shown in FIG. 2, the deflection of the Hutchens Part 355-00 leaf spring assembly at a load of 7750 pounds was only 1.42 inches, the overall deflection curve of the Part 355-00 being shown as line 30 in FIG. 2. This is contrasted with an average deflection of 2.09 inches from the leaf spring assembly 10 of the present invention as measured by physical testing, the overall deflection curve generated by the present invention being shown as line 32 in FIG. 2. In fact, it is noted that the data of FIG. 2 show that the deflection is greater in the present invention leaf spring assembly (as shown in line 32) than in the comparison leaf, spring assembly (as shown in line 30), except at an unloaded condition, when the deflection in each assembly is 0 inches.

While the best mode for practicing the present invention has been described in order to comply with the requirements of the Patent Laws, the scope of the present invention is not to be measured thereby, but instead should be determined from the overall specification and the accompanying claims.

What is claimed is:

1. A leaf spring assembly having a plurality of superposed substantially flat steel plates in an arch configuration wherein said plurality of superposed plates varies in length from top to bottom, the longest of said plates being on top and having ends adapted for attachment to frame fixtures of a vehicle, and the shortest of said plates having a lower surface adapted for attachment to an axle, said leaf spring assembly having a ratio of the length of the longest of said plates to the width of the longest of said plates being at least 20.0:1.0 and a ratio of the horizontal distance between a centerline of the end adaptations and the vertical distance between the tops of said end adaptations and the lower surface being greater than about 6.0:1.0, the resulting spring assembly characterized by an average deflection of at least about 2 inches when an overall force of 7750 pounds is imposed upon a midpoint of the shortest of the plurality of plates in the direction of the arch and further being characterized by an average deflection of at least about 3 inches when an overall force of 12000 pounds is imposed upon the same midpoint.

2. The leaf spring assembly of claim 1 wherein the two ends of the longest of the plurality of plates are mounted such that the ends are generally symmetrical to the midpoint and are at least 55 inches apart.

3. The leaf spring assembly of claim 1 wherein the width of each of the plurality of plates is less than 5% of the length of the longest of the plurality of plates.

4. A laminated leaf spring assembly, comprising:

a plurality of superposed steel plates, each being adapted to undergo bending deformation in a direction perpendicular to the length thereof and parallel to the thickness thereof; and a central portion of each of said plates in the lengthwise direction having a constant maximum thickness, the thickness gradually decreasing towards the opposite ends of the plate to form tapered portions, wherein said plurality of superposed plates varies in length from top to bottom, the longest of said plates being on top and having ends adapted for attachment to frame fixtures of a vehicle, the ratio of the length of the longest of said plates to the width of said plate is at least 20.0:1, and the shortest of said plates having a lower surface adapted for attachment to an axle, wherein said leaf spring assembly is characterized by a ratio of the horizontal distance between a centerline of the end adaptations and the vertical distance between the tops of said end adaptations and the lower surface, such ratio being greater than about 6.0:1.

5. The leaf spring assembly of claim 4 wherein the ends of the longest plate are formed into hooks.

6. The leaf spring assembly of claim 5, wherein the ratio of the horizontal distance between the centerlines of the hooks and the vertical distance between the tops of the hooks and the lower surface of the leaf spring assembly is greater than 8.0:1.

7. The leaf spring assembly of claim 4, wherein the assembly comprises at least four said superposed plates.

8. The leaf spring assembly of claim 5 wherein the longest plate of said plurality of said superposed plates has a span of at least 55 inches between the centerlines of said hooks, one of said hooks at each end of said plate, when the assembly is in an unloaded condition.

* * * * *